(12) United States Patent
Seo et al.

(10) Patent No.: US 7,092,545 B2
(45) Date of Patent: Aug. 15, 2006

(54) APPARATUS AND METHOD FOR EMBEDDING AND EXTRACTING A DIGITAL WATERMARK BASED ON A WAVELET

(75) Inventors: Yong-Seok Seo, Daejeon (KR); Sanghyun Joo, Daejeon (KR); Weon Geun Oh, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 756 days.

(21) Appl. No.: 10/329,546

(22) Filed: Dec. 27, 2002

(65) Prior Publication Data

US 2004/0047489 A1  Mar. 11, 2004

(30) Foreign Application Priority Data

Sep. 6, 2002 (KR) ................. 2001-53904

(51) Int. Cl.
*G06K 9/00* (2006.01)
(52) U.S. Cl. ..................... 382/100
(58) Field of Classification Search .......... 382/100
See application file for complete search history.

(56) References Cited

U.S. PATENT DOCUMENTS 6,285,775 B1 * 9/2001 Wu et al. ................. 382/100
6,301,368 B1 * 10/2001 Bolle et al. ............... 382/100
6,332,030 B1 * 12/2001 Manjunath et al. ......... 382/100
6,556,689 B1 * 4/2003 Xia et al. .................. 382/100

FOREIGN PATENT DOCUMENTS

KR    0074604    8/2001

OTHER PUBLICATIONS

Brian Chen and Gregory W. Wornell, "Quantization Index Modulation: A Class of Provably Good Methods for Digital Watermarking and Information Embedding", IEEE Transaction on Information Theory, vol. 47, No. 4, May 2001, pp. 1423-1443.

* cited by examiner

*Primary Examiner*—Jingge Wu
*Assistant Examiner*—Tom Y. Lu
(74) *Attorney, Agent, or Firm*—Mayer, Brown, Rowe and Maw LLP

(57) ABSTRACT

In an apparatus for embedding digital watermarks into an image, a watermark embedding region extraction unit extracts an image region to contain watermarks from a wavelet transformed entire image. A watermark generation unit generates a watermark data row to be embedded according to a user's private key. A normalization operation unit normalizes the quantized data value by using a quantization unit into a normalized data value. An inverse quantization inversely quantizes and outputs the normalized data value. A watermark embedment unit embeds a watermark-embedded data value as a corresponding pixel data value into the watermark embedding region, wherein the watermark-embedded data value is obtained by subtracting, from the inversely quantized data value, the watermark data value added prior to the quantization.

20 Claims, 7 Drawing Sheets

APPARATUS AND METHOD FOR EMBEDDING AND EXTRACTING A DIGITAL WATERMARK BASED ON A WAVELET

FIELD OF THE INVENTION

The present invention relates to a digital watermarking method based on a wavelet; and, more particularly, to an apparatus and a method for embedding/extracting digital watermarks based on the wavelet into/from an image by quantizing and inversely quantizing DC components in a wavelet transform domain.

BACKGROUND OF THE INVENTION

Recently, a digital media and an electronic publishing business have been popularized and dramatically developed. Further, the rapid growth of the Internet makes communication easier and more extensive than before, while the advent of digital multimedia enables the creation and dissemination of products quickly via electronic means.

Since the digital data has no difference in quality between an original and a copy thereof, it is impossible to distinguish the original from the copy thereof. Accordingly, it is needed to protect Intellectual-property rights for audio, video, images and other documents and perform authentication, especially against an illegal copying, distribution and modification of the digital data.

To that end, information protecting methods, such as an encryption, a Firewall or the like, are conventionally employed. However, the methods have a drawback in that there is no solution to prevent users who are allowed to access data from illegally copying and modifying the data.

To solve these problems, in recent days a digital watermarking technique, which is known for its effectiveness to prevent the illegal copying of the digital data, is being widely used. The technique is used for hiding copyright information or user information so as to keep digital contents from being copied. To be specific, signals that are imperceptible under normal viewing conditions, i.e., specific data rows called as watermarks, are embedded into multimedia contents, e.g., audio, video, image and text contents, created by a copyrighter in order to protect copyrights thereon.

There have proposed several watermarking methods in a transform-domain Discrete Cosine Transform (DCT) based on a frequency domain. For example, in a method suggested by I. J. Cox, an N×N DCT is performed on an original image. Then, a real number sequence is added to upper DCT coefficients except DC components, wherein the number of the DCT coefficients is n, n being a positive integer. In another method, it is determined whether watermarks are embedded into an image or not, based on a Just Noticeable Difference (JND) value by using a Human Visual System (HVS). Then, the JND is included in image into which a watermark is embedded. Further, in a recent method, watermarks are invisibly embedded into the DC components in a DCT region.

However, as a highly efficient compression is required for image and video data, a great deal of development has been devoted to the image data compression using a wavelet transform. A compression standard, JPEG2000, is an image compression method based on the wavelet while a conventional JPEG standard is based on the DCT, so that various watermarking techniques employing the JPEG 2000 are being developed.

The watermark embedding method based on the wavelet transform is categorized into several methods. For instance, there is a method for embedding a watermark signal having a different length into every high frequency domain except a lowest frequency domain. Further, there is another method for embedding a watermark signal into a large coefficient. In most watermark embedding methods, however, it is considered that the HVS is sensitive to changes in low frequency components rather than those in high frequency components. Thus, after the wavelet and the frequency transform is performed, it is widely carried out to embed watermarks into remaining frequency components except the lowest frequency component, i.e., the DC component. However, in case a high compression rate generated by embedding the watermarks into the images is applied to the high and middle frequency components or in case an intentional attack occurs to remove the watermarks, it is impossible to detect the watermarks. As a result, a blind type watermarking method based on the wavelet, which is able to trade off distortion and robustness, has been required.

SUMMARY OF THE INVENTION

It is, therefore, an object of the present invention to provide an apparatus and a method for embedding/extracting digital watermarks based on a wavelet into/from an image by quantizing and inversely quantizing DC components in a wavelet-based transform domain.

In accordance with one aspect of the invention, an apparatus for embedding digital watermarks into an image based on a wavelet includes: a watermark embedding region extraction unit for extracting an image region to contain watermarks from a wavelet transformed entire image; a watermark generation unit for generating a watermark data row to be embedded in accordance with a user's private key; a quantization unit for quantizing each image data value of a watermark embedding region at a predetermined quantization level, wherein the watermark data value is added to the image data value; a normalization operation unit for normalizing the quantized data value into a normalized data value; an inverse quantization for inversely quantizing and outputting the normalized data value; and a watermark embedment unit for embedding a watermark-embedded data value as a corresponding pixel data value into the watermark embedding region of the original image, wherein the watermark-embedded data value is obtained by subtracting the watermark data value added prior to the quantization from the inversely quantized data value.

In accordance with another aspect of the invention, an apparatus for extracting digital watermarks based on a wavelet includes: a watermark embedding region extraction unit for extracting a watermark-embedded image region from a wavelet transformed entire image; a watermark generation unit for generating a watermark data row in accordance with a user's private key; a quantization unit for quantizing each watermark-embedded pixel data value added to the watermark data value at a predetermined quantization level; a normalization operation unit for normalizing the quantized data value into a normalized data value; an inverse quantization unit for inversely quantizing and outputting the normalized data value; a watermark extraction unit for subtracting the watermark data value added prior to the quantization from the inversely quantized data value, comparing an absolute value of a difference between the watermark-subtracted data value and the watermark-embedded data value, determining and extracting a sign of the watermark data in the watermark-embedded pixel data.

In accordance with still another aspect of the invention, a method for extracting digital watermarks from an image in a wavelet-based digital watermark extracting apparatus includes the steps of: (a') extracting a watermark-embedded image region from a wavelet transformed entire image; (b') performing quantization on each watermark-embedded pixel data value added to the watermark data value; (c') normalizing the quantized data value into a normalized data value; (d') subtracting, after the normalized data value is inversely quantized, a watermark data value added prior to the quantization from the inversely quantized data value; and (e') comparing an absolute value of a difference between the watermark-subtracted data value and the watermark-embedded data value, determining and extracting a sign of the watermark data in the watermark-embedded pixel data.

In accordance with still another aspect of the invention, A method for extracting digital watermarks from an image in a wavelet-based digital watermark extracting apparatus, comprising the steps of: (a') extracting a watermark-embedded image region from a wavelet transformed entire image; (b') performing quantization on each watermark-embedded pixel data value added to the watermark data value; (c') normalizing the quantized data value into a normalized data value; (d') subtracting, after the normalized data value is inversely quantized, a watermark data value added prior to the quantization from the inversely quantized data value; and (e') comparing an absolute value of a difference between the watermark-subtracted data value and the watermark-embedded data value, determining and extracting a sign of the watermark data in the watermark-embedded pixel data.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Hereinafter, operations of preferred embodiments of the present invention are described in detail with reference to the accompanying drawings.

Figure 1:
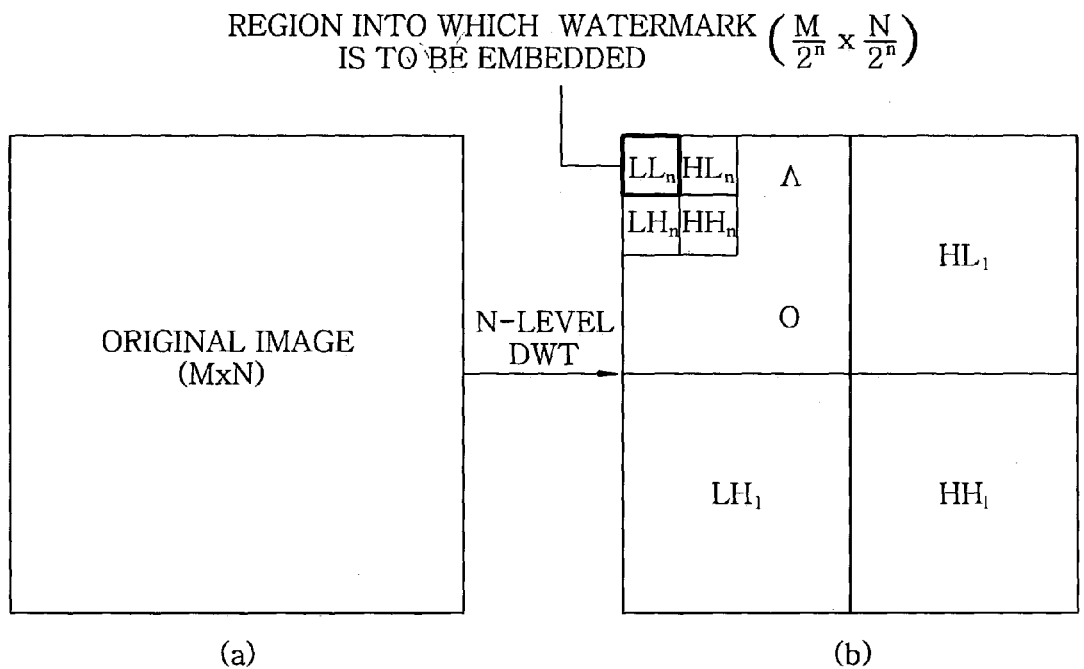
FIG. 1 shows a conceptual diagram for setting up a region to contain watermarks in accordance with a first preferred embodiment of the present invention.

FIG. 1 shows a wavelet transform process for embedding watermarks in accordance with a first preferred embodiment of the present invention. In case watermarks are embedded into a specific image in order to protect copyrights, i.e., when the watermarks are embedded into an original image shown in (a) of FIG. 1, an n-level wavelet transform (DWT) is performed on the original image as shown in (b) of FIG. 1. In this case, since a size of a DC region to contain the watermarks is determined according to the levels of the wavelet transform, the appropriate level is determined not to cause deterioration in an image generated by the embedding of the watermarks. For example, a maximum size of the DC region for containing the watermarks is identical to a size of the original image. Therefore, in case the n-level DWT is performed on an M×N image, an $LL_n$ region is determined to contain the watermarks as shown in Eq. (1) as follows:

$$\text{size}(LL_n) = \frac{M}{2^n} \times \frac{N}{2^n} \qquad \text{Eq. (1)}$$

It is preferable to determine the size of the region in consideration of a length of a watermark data row, intensity of the embedding of the watermark data row and a degree of the image deterioration caused by the embedding thereof.

Further, to select a filter for use in the wavelet transform affects watermarking system performance. To that end, the apparatus for embedding/extracting wavelet-based watermarks uses a daubechies 9-7 filter in the present invention, which is adopted as a basic filter in JPEG2000 that is a new still image compression international standard.

Figure 2:
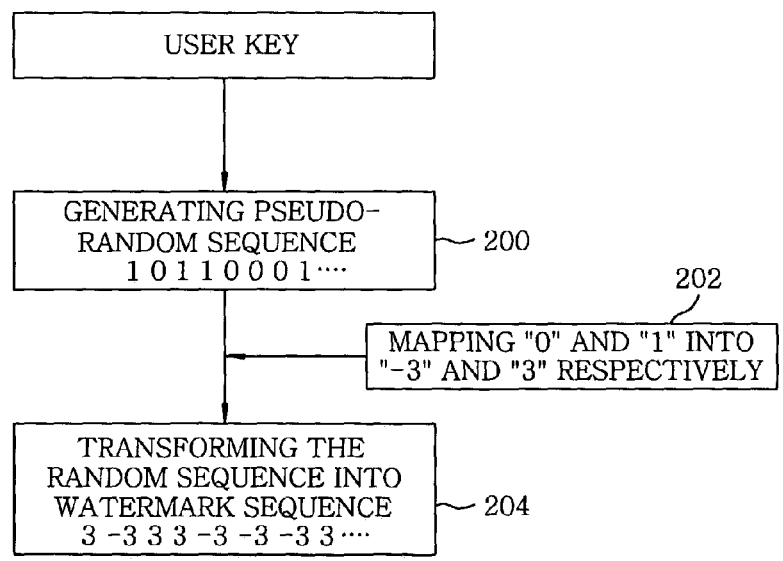
FIG. 2 illustrates a flow chart for showing a generation of the watermarks in accordance with the first preferred embodiment of the present invention.

In this case, a watermark sequence data row is used as watermark information to be embedded into an image, wherein a process to obtain the sequence data row is described as follows. A pseudo-random sequence having "0" and "1" is generated by using a user key as shown in FIG. 2 (step S200) Next, "0" and "1" are mapped into "−3" and "3", respectively (step S202) and then the pseudo-random sequence is thus transformed into a watermark sequence to generate the watermark sequence data row (step S204).

Figure 3:
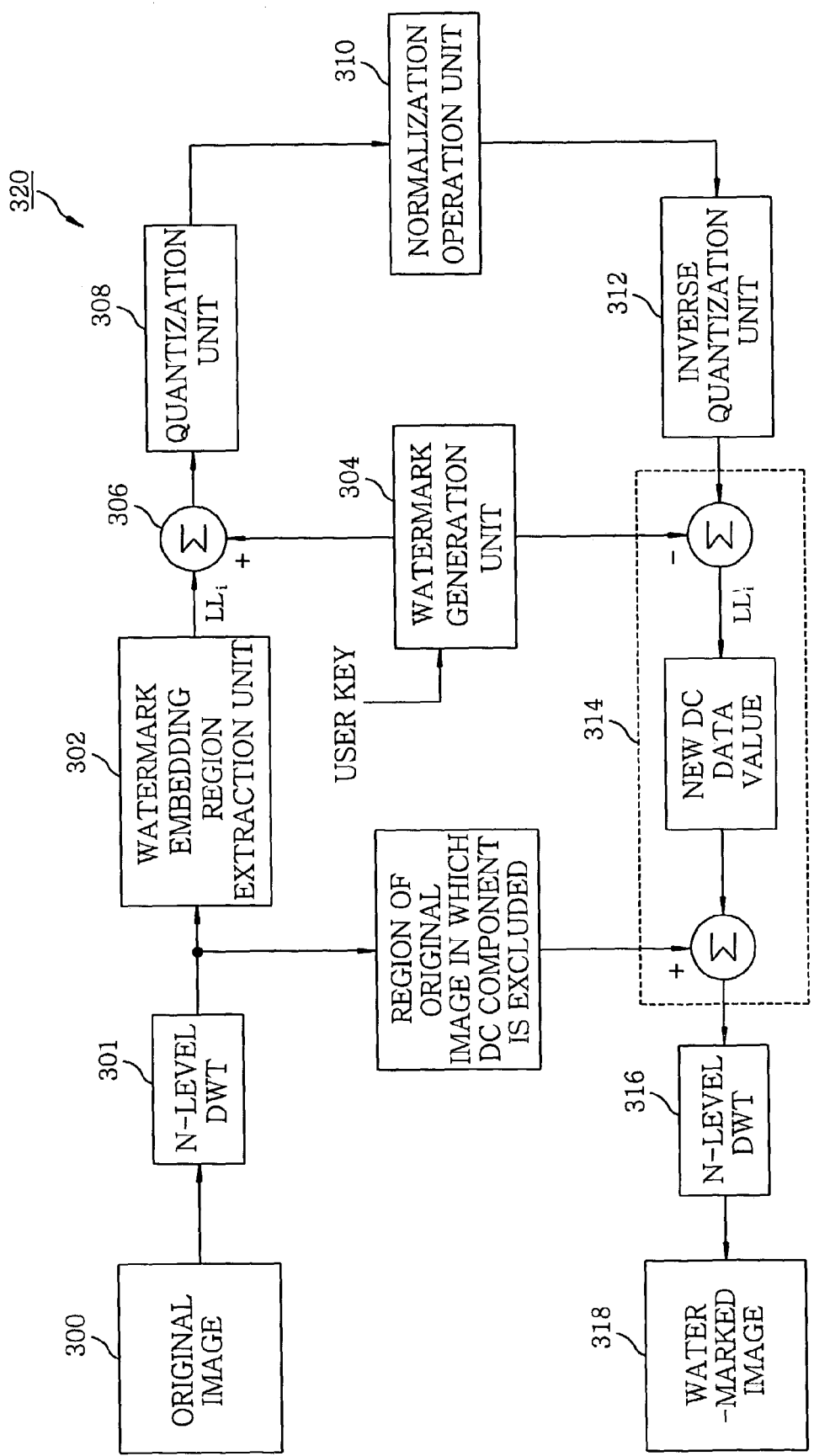
FIG. 3 describes a block diagram for illustrating an apparatus for embedding the watermarks based on a wavelet in accordance with the first preferred embodiment of the present invention.

FIG. 3 provides a block diagram of a blind type digital watermark embedding apparatus 320 based on a wavelet in accordance with the first preferred embodiment of the present invention. The blind type digital watermark embedding process will be described hereinafter.

A watermark embedding region extraction unit 302 extracts a watermark embedding region from an original image 300 on which an n-level forward DWT 301 is performed, wherein the watermark embedding region is a DC component region to contain watermarks. A watermark generation unit 304 generates a watermark data row ($w_i$) obtained by mapping "1" and "0" of a pseudo-random sequence into "3" and "−3", wherein the pseudo-random sequence row was represented by an input of a user's private key.

In an addition unit 306, the watermark data generated from the watermark generation unit 304 is added to data in the DC component region of the original image on which the n-level DWT 301 is performed, thereby outputting the added result to a quantization unit 308. The quantization unit 308 performs from the addition unit 306 quantization on the DC component data value added with the watermark data value. A normalization operation unit 310 performs a descending operation on the quantized value from the quantization unit 308 if the added watermark data is a positive value while an ascending operation thereon if the data is a negative value, so that the quantized value is normalized and outputted.

In an inverse quantization unit 312, the value outputted from the normalization operation unit 310 is inversely quantized and then is outputted to a watermark embedment unit 314. The watermark embedment unit 314 subtracts from the inversely quantized data value the added watermark data value prior to the quantization. Then, the subtracted value is set to be a watermarked data value and then embedded into the watermark embedding region of the original image as a corresponding pixel data value. Next, an n-level inverse DWT 316 is performed on the watermarked image and is transformed into a watermarked image 318 on which a digital watermarking is carried out.

Figure 4:
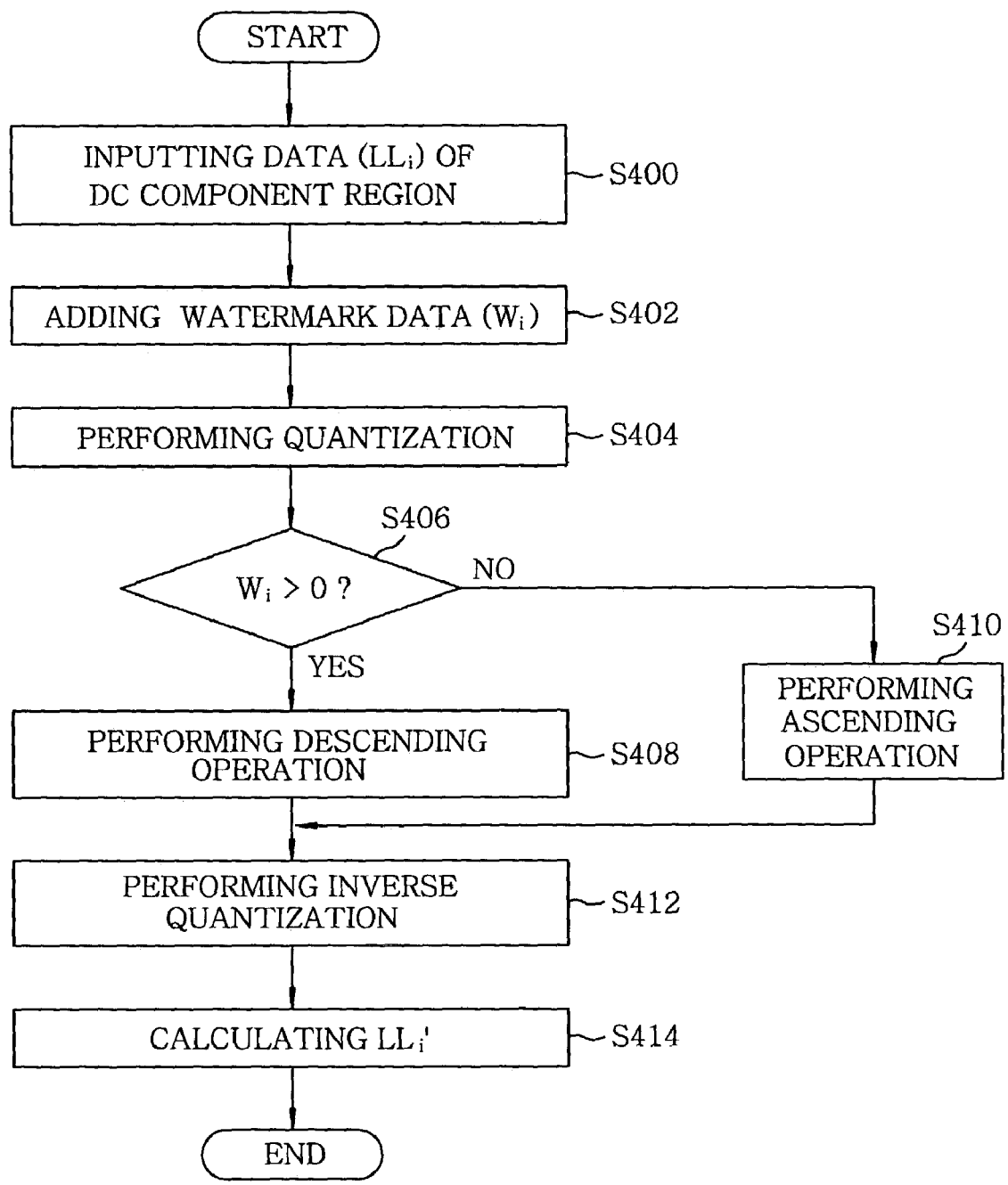
FIG. 4 depicts a flow chart for showing a watermark embedding process in accordance with the first preferred embodiment of the present invention.

FIG. 4 represents a watermark embedding process in the watermark embedding apparatus in accordance with the preferred embodiment of FIG. 3. The watermark embedding process of the present invention will now be described in detail with reference to FIGS. 3 and 4.

A watermark embedding apparatus 320 receives via the watermark embedding region extraction unit 302 a data row ($LL_i$) of the DC component region in the data of the original image 300 on which the n-level DWT is performed, wherein a watermark is embedded into the DC component region (step S400). Next, the watermark embedding apparatus 320 adds to the data ($LL_i$) a user's private watermark data ($w_i$) generated by the user key from the watermark generation unit 304 (step S402). Then, the added result is quantized into a predetermined quantization level by using the quantization unit 308 (step S404).

Further, the watermark embedding apparatus 320 checks during the quantization whether the watermark data value ($w_i$) is positive or negative (step S406). At this time, if the watermark data value is positive, the watermark embedding apparatus 320 performs a descending operation on the quantized data value and then normalizes the value by using the normalization operation unit 310 (step S408). On the other hand, if the data value is negative, the apparatus 320 performs an ascending operation on the quantized data value and then normalizes the value by the normalization operation unit 310 (step S410).

Thereafter, the watermark embedding apparatus 320 performs inverse quantization on the quantized data (step S412) and subtracts, from the inversely quantized data, the watermark data identical to what is used in the step 402 to thereby produce a new DC component data value ($LL_i'$) with the watermarks embedded (step S414). As a result, the embedding of the watermarks is performed by embedding the new data value ($LL_i'$) into the DC region of the original image.

In this case, the data value ($LL_i'$) can be represented as follows:

$$LL_i' = Q_\Delta^{-1}\{\lceil Q_\Delta(LL_i + w_i) \rceil\} - w_i, \text{ if } w_i > 0$$

$$= Q_\Delta^{-1}\{\lfloor Q_\Delta(LL_i + w_i)_{538} \rfloor\} - w_i, \text{ otherwise} \quad \text{Eq.(2)}$$

wherein $Q_\Delta$ and $Q_\Delta^{-1}$ represent $\Delta$ level quantization and $\Delta$ level inverse quantization, respectively, and $w_i$ is a watermark data row.

Figure 5:
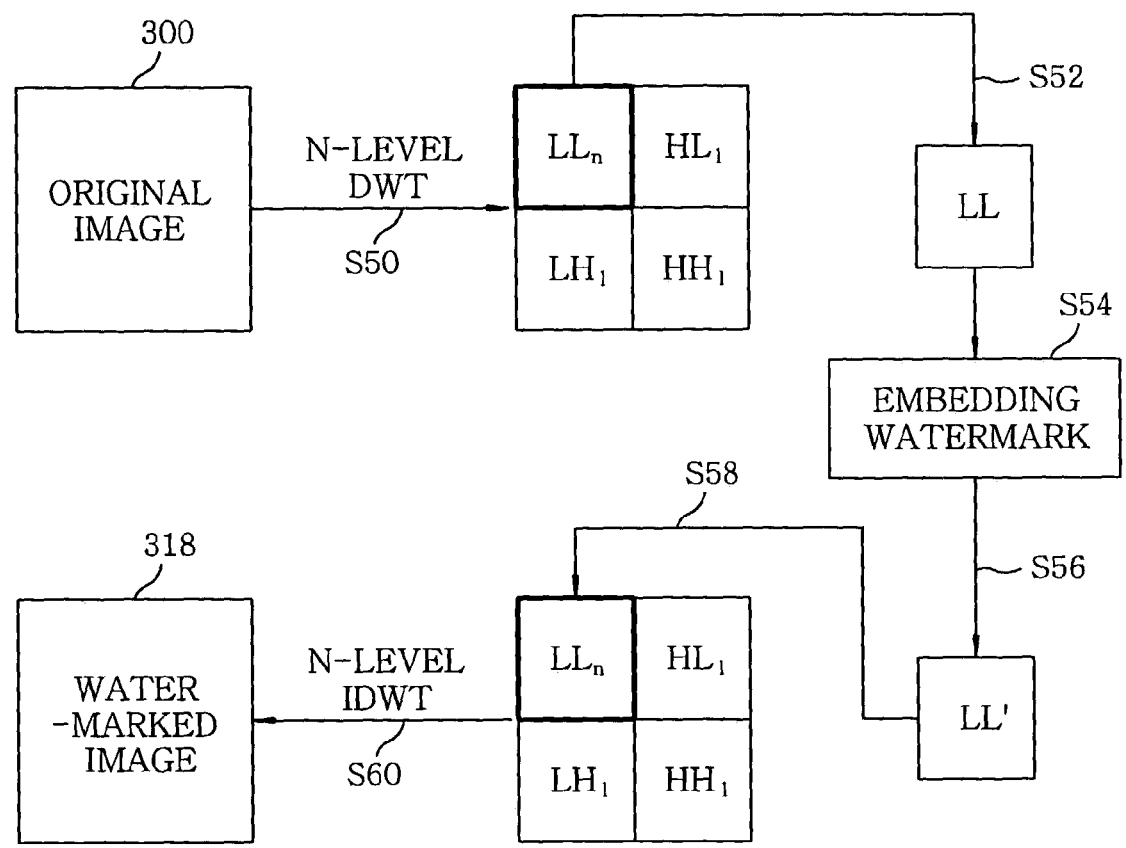
FIG. 5 presents a conceptual diagram for illustrating the watermark embedding process in a wavelet transformed DC region in accordance with the first preferred embodiment of the present invention.

FIG. 5 presents a conceptual diagram for illustrating the watermark embedding process based on the wavelet in accordance with the first preferred embodiment of the present invention. In case the watermarks are required to be embedded into a specific original image 300 as shown in FIG. 5, a level of wavelet transform is determined in accordance with a size of watermarks. Then, a corresponding n-level wavelet transform is performed on the original image (step S50), wherein the level of the wavelet transform is determined not to generate deterioration in image quality on the original image. Next, a DC component region (LL) set to be the watermark embedding region in the wavelet transformed original image is extracted by the watermark embedding region extraction unit 302 (step S52). Then, the watermarks are embedded into pixel data by quantizing and inversely quantizing the pixel data in the extracted DC component region (LL), thereby generating a new watermark-embedded image of the new DC component region (LL') (step S54 and step S56). After the new watermark-embedded image of the DC component region (LL') is included as an image in the DC component region of an entire image, i.e., the wavelet transformed original image (step S58), an inverse wavelet transform is performed on the entire image having the watermark-embedded image (step S60) to generate a watermarked image 318.

Figure 6:
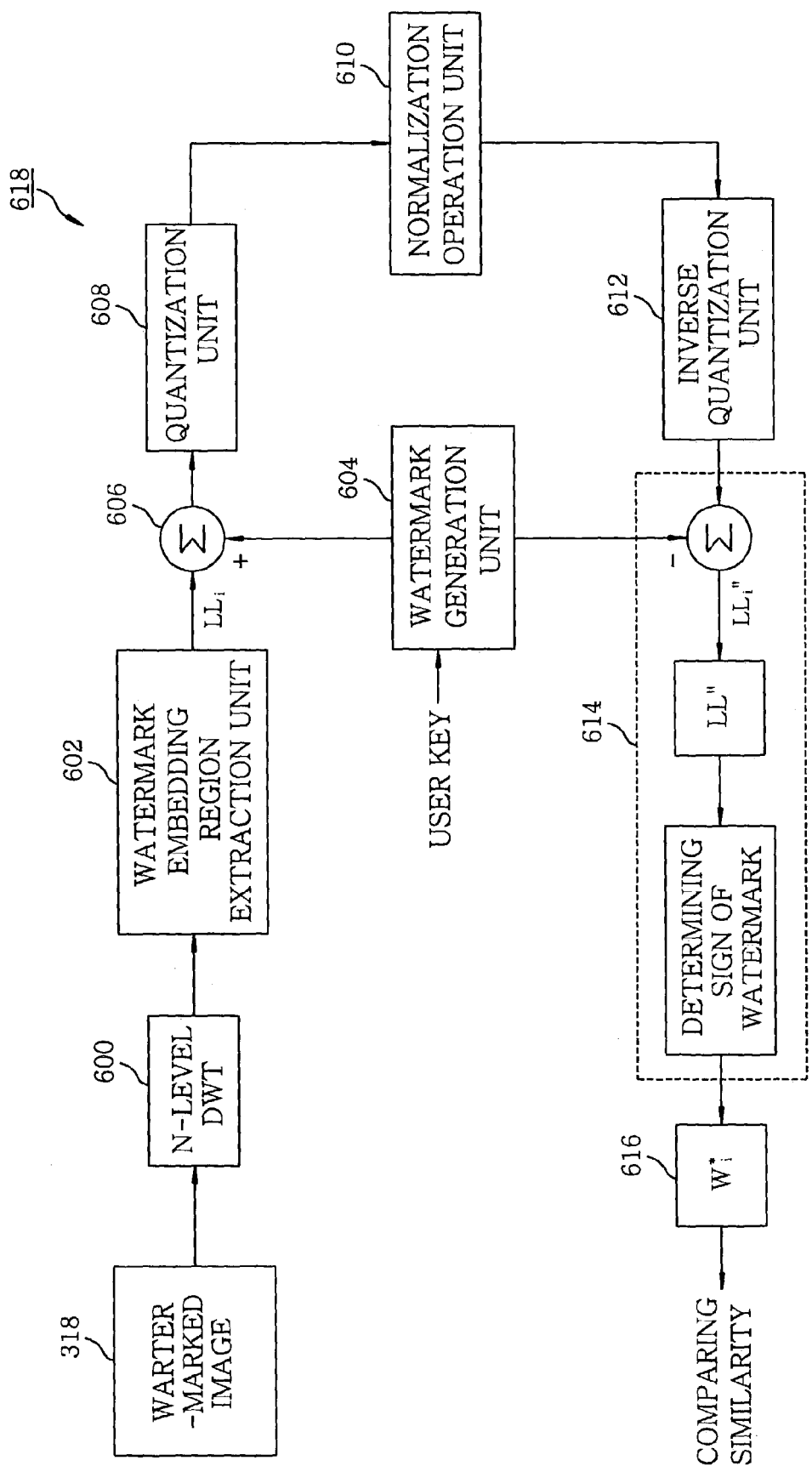
FIG. 6 provides a block diagram for showing an apparatus for extracting watermarks based on a wavelet from an image in accordance with a second preferred embodiment of the present invention.

FIG. 6 provides a block diagram for showing an apparatus for extracting watermarks based on a wavelet in accordance with a second preferred embodiment of the present invention. A blind type digital watermark extracting process will now be described.

First, in order to extract the embedded watermarks, an n-level wavelet transform 600 is performed on the watermarked image 318, wherein the level of the wavelet transform is identical to that applied when the watermarks were embedded. A watermark embedding region extraction unit 602 extracts data row ($LL_i'$) of the watermark-embedded DC component region from the watermarked image 318.

A watermark generation unit 604 generates a watermark data row ($w_i$) mapping "1" and "0" of a pseudo-random sequence row into "3" and "−3", respectively, wherein the pseudo-random sequence is generated by an input of a user's private key value.

In an addition unit 606, values of the watermark data generated from the watermark generation unit 604 are added to corresponding DC component data values of the DC component region to contain watermarks, thereby outputting the added values to a quantization unit 608.

The quantization unit 608 performs quantization on the added values. In a normalization operation unit 610, the quantized value from the quantization unit 608 is normalized and outputted by using an ascending operation. An inverse quantization unit 612 performs an inverse quantization on the normalized value outputted from the normalization operation unit 610.

In a watermark extraction unit 614, the values of the watermark data from the watermark generation unit 604 prior to the quantization is subtracted from the inversely quantized data value. Then, by comparing an absolute value of a difference between the subtracted data value and the watermark-embedded pixel data value, a sign of watermark data in the watermark-embedded pixel data is determined to thereby extract a watermark data row ($w^*_i$) 616 that was embedded during the watermarking.

Figure 7:
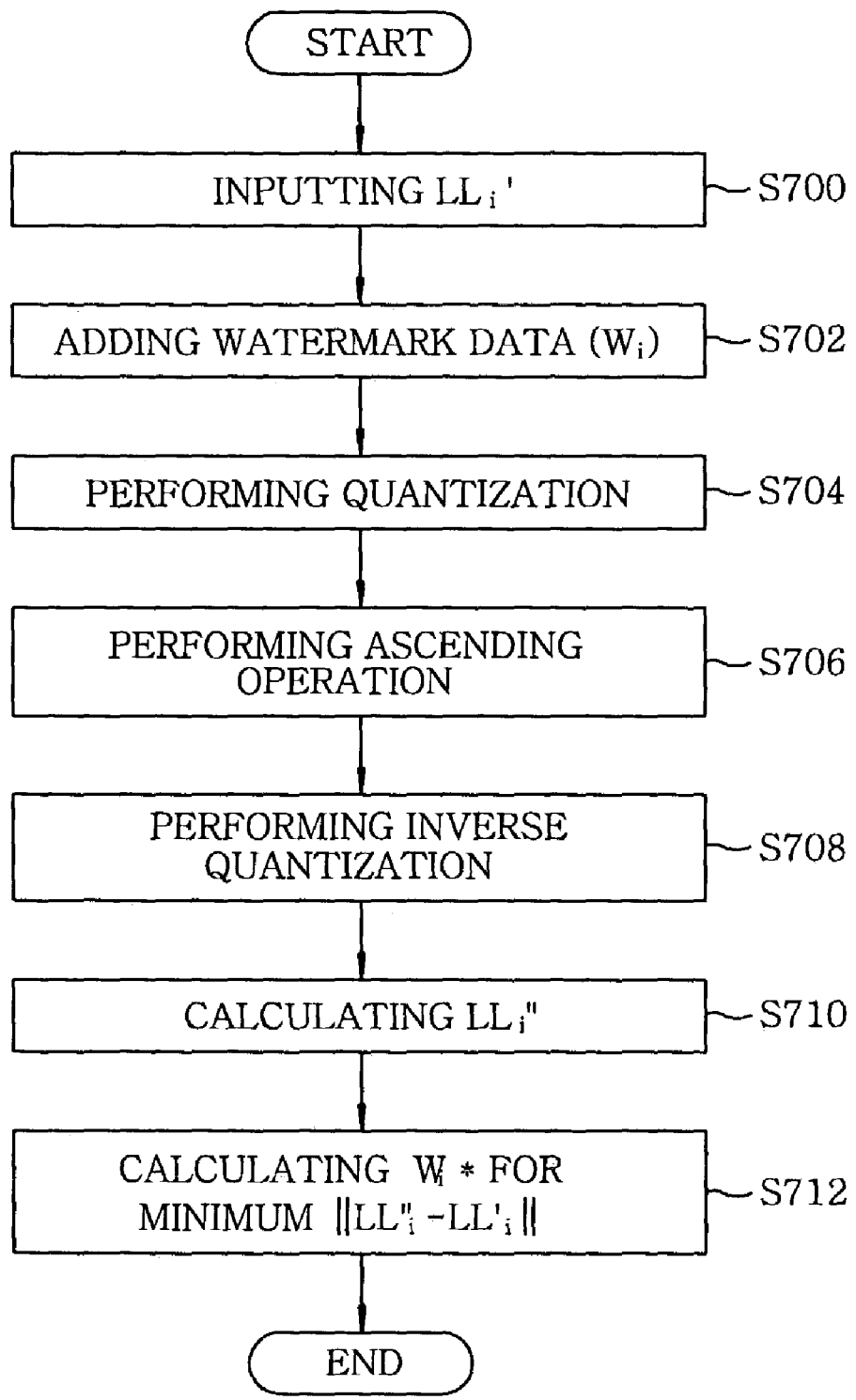
FIG. 7 represents a flow chart for showing a watermark extracting process in accordance with the second preferred embodiment of the present invention.

FIG. 7 represents a flow chart for showing the watermark extracting process in accordance with the preferred embodiment of FIG. 6. A watermark extracting process of the present invention will be described in detail hereinafter with reference to FIGS. 6 and 7.

A watermark extracting apparatus 618 extracts data in the watermark-embedded DC component region from the n-level wavelet transformed original data by using the watermark embedding region extraction unit 602 (step S700). The watermark extracting apparatus 618 adds the original watermark data ($w_i$) to data ($LL_i'$) in the watermark-embedded DC component region, wherein the original watermark data ($w_i$) is generated from the watermark generation unit 604 by the user's key (step S702). The added data is quantized into a predetermined quantization level by the quantization unit 608 (step S704).

The watermark extracting apparatus 618 also performs an ascending operation on the quantized data value, thereby normalizing the quantized data value by using the normalization operation unit 610 (step S706). The inverse quantization is performed on the normalized data value (step S708). The apparatus 618 further subtracts the watermark data value ($w_i$) from the inversely quantized data value to calculate a new DC component data ($LL_i''$), wherein the watermark data value ($w_i$) is identical to that added to the DC component region data value in the step S702. Next, the apparatus 618 determines a watermark data having a sign to make it minimized an absolute value of a difference between the subtracted data value ($LL_i''$) and the watermark-embedded pixel data value ($LL_i'$) (hereinafter referred to as a minimizing watermark data value), thereby extracting the watermark data ($w^*_i$) that was embedded into the original image.

The data ($LL_i''$) in accordance with the above operational control flow can be represented as follows:

$$LL_i'' = Q_\Delta^{-1}\{[Q_\Delta(LL_i' + w_i)]\} \qquad \text{Eq. (3)}$$

wherein $Q_\Delta$ and $Q_\Delta^{-1}$ represent $\Delta$ level quantization and $\Delta$ level inverse quantization, respectively, and $w_i$ is a watermark data row.

In this case, when the sign of the watermark data is determined, the watermark extracting apparatus 614 determines the minimizing watermark data value as the watermark data embedded into the original image ($w^*_i$) as follow:

$$w^*_i = arg_{w_i} \min \|LL_i'' - LL_i'\| \qquad \text{Eq. (4)}$$

Figure 8:
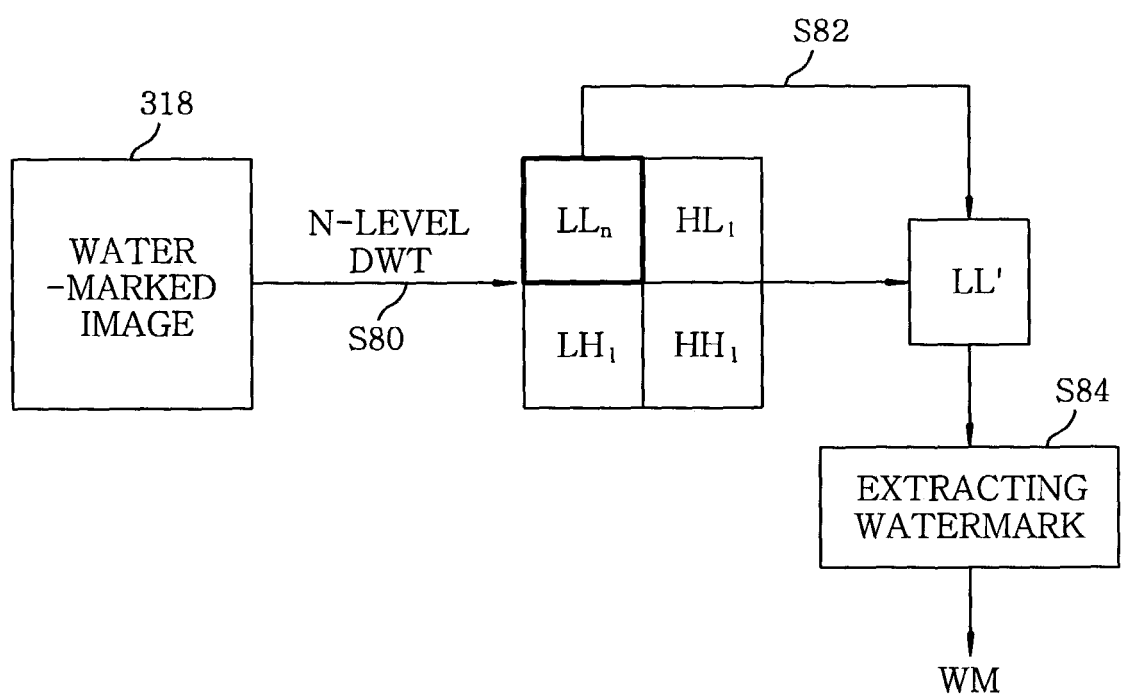
FIG. 8 sets forth a conceptual diagram for showing the watermark extracting process in a wavelet transformed DC region in accordance with the second preferred embodiment of the present invention.

FIG. 8 sets forth a conceptual diagram for illustrating a wavelet-based watermark extracting process in accordance with the second preferred embodiment of the present invention. In case watermarks are required to be extracted from the watermarked image 318, an n-level DWT is performed on the watermarked image 318, wherein a level of the wavelet transform is identical to that applied when the watermarks were embedded (step S 80). Then, the data ($LL_i'$) in the watermark-embedded DC component region of the n-level DWT-performed image is extracted from the watermark embedding region extraction unit 602 (step S82). Subsequently, to extract the watermark is carried out by quantizing and inversely quantizing the data ($LL_i'$) in the extracted DC component region containing the watermark (step S84). Thereafter, the extracted watermark data row is compared with the once embedded watermark data row to check similarity therebetween. It is thus determined whether the watermarks exist or not.

As described above, the present invention has advantages in that watermarks can be embedded in a DC component region of a wavelet transformed image by using quantization and inverse quantization process to thereby keep the watermarks stable against external attacks such as an image compression.

Further, the present invention can be applied to a still image as well as audio/video data requiring real-time embedding/extracting by using a blind type in which no original image is required during extracting the watermarks.

While the invention has been shown and described with respect to the preferred embodiments, it will be understood by those skilled in the art that various changes and modifications may be made without departing from the spirit and scope of the invention as defined in the following claims.

What is claimed is:

1. An apparatus for embedding digital watermarks into an image based on a wavelet, the apparatus comprising:

a watermark embedding region extraction unit for extracting an image region to contain watermarks from a wavelet transformed entire image;

a watermark generation unit for generating a watermark data row to be embedded in accordance with a user's private key;

a quantization unit for quantizing each image data value of a watermark embedding region at a predetermined quantization level, wherein the watermark data value is added to the image data value;

a normalization operation unit for normalizing the quantized data value into a normalized data value;

an inverse quantization for inversely quantizing and outputting the normalized data value; and a watermark embedment unit for embedding a watermark-embedded data value as a corresponding pixel data value into the watermark embedding region of the original image, wherein the watermark-embedded data value is obtained by subtracting the watermark data value added prior to the quantization from the inversely quantized data value.

2. The apparatus of claim 1, wherein the watermark embedding region is a wavelet transformed DC component region of the original image into which the watermarks are required to be embedded.

3. The apparatus of claim 1, wherein the normalization operation unit normalizes a watermark data value by performing a descending operation when the watermark data value is positive while an ascending operation when negative, wherein the watermark data value is added to the DC component data value in the watermark embedding region before quantization is performed.

4. The apparatus of claim 1, wherein the watermark-embedded wavelet transformed DC component data row ($LL_i'$) is calculated as follows:

$$LL_i' = Q_\Delta^{-1}\{[Q_\Delta(LL_i + w_i)^1]\} - w_i, \text{ if } w_i > 0$$

$$= Q_\Delta^{-1}\{[Q_\Delta(LL_i + w_i)]\} - w_i, \text{ otherwise}$$

wherein $w_i$, $LL_i$, $Q_\Delta$ and $Q_\Delta^{-1}$ represent a watermark data row, a DC component data row of the wavelet transformed original image, $\Delta$ level quantization and $\Delta$ level inverse quantization, respectively.

5. An apparatus for extracting digital watermarks based on a wavelet, the apparatus comprising:

a watermark embedding region extraction unit for extracting a watermark-embedded image region from a wavelet transformed entire image;

a watermark generation unit for generating a watermark data row in accordance with a user's private key;

a quantization unit for quantizing each watermark-embedded pixel data value added to the watermark data value at a predetermined quantization level;

a normalization operation unit for normalizing the quantized data value into a normalized data value;

an inverse quantization unit for inversely quantizing and outputting the normalized data value;

a watermark extraction unit for subtracting the watermark data value added prior to the quantization from the inversely quantized data value, comparing an absolute value of a difference between the watermark-subtracted data value and the watermark-embedded data value, determining and extracting a sign of the watermark data in the watermark-embedded pixel data.

6. The apparatus of claim 5, wherein the watermark embedding region is a wavelet transformed DC component region of an original image into which the watermarks are required to be embedded.

7. The apparatus of claim 5, wherein the normalization operation unit performs an ascending operation and normalizes the quantized data value, regardless of a sign of a watermark data value added to a DC component data value in the watermark embedding region.

8. The apparatus of claim 5, wherein the wavelet transformed DC component data row ($LL_i''$) from which the watermark data value is subtracted is calculated as follows:

$$LL_i''=Q_\Delta^{-1}\{\lceil Q_\Delta(LL_i'+w_i)\rceil\}$$

wherein $w_i$, $LL_i'$, $Q_\Delta$ and $Q_\Delta^{-1}$ represent a watermark data row, wavelet transformed DC component data row of the watermarked original image, $\Delta$ level quantization and $\Delta$ level inverse quantization, in order.

9. The apparatus of claim 5, wherein the watermark extraction unit determines watermark data having a sign to make it minimized an absolute value of a difference between the watermark-subtracted data value and the watermark-embedded data value and extracts it as watermark data embedded into an original image.

10. The apparatus of claim 9, the extracted watermark data row ($w^*_i$) is determined as data to make it minimized an absolute value of a difference between the watermark-subtracted data value ($LL_i''$) and the watermark-embedded pixel data value ($LL_i'$) as follows:

$$w^*_i=arg_{w_i}min\|LL_i''-LL_i'\|$$

wherein $w_i$ represents a watermark data row.

11. A method for embedding a digital watermark into an image based on a wavelet, the method comprising the steps of:

(a) extracting a watermark embedding region to contain a watermark data row from the image by performing various levels of a wavelet transform in accordance with a size of a watermark data row on an entire image into which watermarks are required to be embedded;

(b) performing quantization on each image data value by adding a watermark data value to each image data value of the watermark embedding region;

(c) normalizing the quantized data value into a normalized data value;

(d) performing an inverse quantization on the normalized data value;

(e) outputting a watermark-embedded data value by subtracting the watermark data value added prior to the quantization from the inversely quantized data value; and (f) embedding the outputted watermark-embedded data value as a corresponding pixel data value into the watermark embedding region of the original image.

12. The apparatus of claim 11, wherein the watermark embedding region in the step (a) is a wavelet transformed DC component region of an original image into which watermarks are required to be embedded.

13. The apparatus of claim 11, wherein the step (c) further includes the steps of:

(c1) normalizing the quantized data value by performing a descending operation thereon when a watermark data value is positive, wherein the watermark data value is added to a DC component data value in the watermark embedding region before the quantization is performed; and (c2) normalizing the quantized data value by performing an ascending operation thereon when a watermark data value is negative, wherein the watermark data value is added to a DC component data value in the watermark embedding region before the quantization is performed.

14. The apparatus of claim 11, wherein the watermarked wavelet transformed DC component data row ($LL_i'$) is calculated as follows:

$$LL_i'=Q_\Delta^{-1}\{\lfloor Q_\Delta(LL_i+w_i)\rfloor\}-w_i, \text{ if } w_i>0$$

$$=Q_\Delta^{-1}\{\lceil Q_\Delta(LL_i+w_i)\rceil\}-w_i, \text{ otherwise}$$

wherein $w_i$, $LL_i$, $Q_\Delta$ and $Q_\Delta^{-1}$ represent a watermark data row, a DC component data row of the wavelet transformed original image, $\Delta$ level quantization and $\Delta$ level inverse quantization, in order.

15. A method for extracting digital watermarks from an image in a wavelet-based digital watermark extracting apparatus, the method comprising the steps of:

(a') extracting a watermark-embedded image region from a wavelet transformed entire image;

(b') performing quantization on each watermark-embedded pixel data value added to the watermark data value;

(c') normalizing the quantized data value into a normalized data value;

(d') subtracting a watermark data value added prior to the quantization from the inversely quantized data value by performing inverse quantization on the normalized data value; and (e') comparing an absolute value of a difference between the watermark-subtracted data value and the watermark-embedded data value, determining and extracting a sign of the watermark data in the watermark-embedded pixel data.

16. The apparatus of claim 15, wherein the watermark extraction region in the step (a') is a wavelet transformed DC component region of an original image into which watermarks are required to be embedded.

17. The apparatus of claim 15, wherein the quantized data value in the step (c') is normalized by using an ascending operation.

18. The apparatus of claim 15, wherein the data row ($LL_i''$) of the wavelet transformed DC component is calculated as follows:

$$LL_i''=Q_\Delta^{-1}\{\lceil Q_\Delta(LL_i'+w_i)\rceil\}$$

wherein $w_i$, $LL_i'$, $Q_\Delta$ and $Q_\Delta^{-1}$ represent a watermark data row, a wavelet transformed DC component data row of the watermarked original image, $\Delta$ level quantization and $\Delta$ level inverse quantization, in order.

19. The apparatus of claim 15, wherein watermark data having a sign to make it minimized an absolute value of a difference between the watermark-subtracted data value and the watermark-embedded data value in the step (e') is extracted.

20. The method of claim 19, wherein the extracted watermark data row ($w^*_i$) is determined as data to make it minimized an absolute value of a difference between the watermark-subtracted data value and the watermarked-embedded data value as follows:

$$w^*_i = arg_{w_i} \min \|LL_i'' - LL_i'\|$$

wherein $w_i$ represents a watermark data row.

* * * * *